United States Patent [19]

Goncze

[11] Patent Number: 5,417,242
[45] Date of Patent: May 23, 1995

[54] FLUID VALVE
[75] Inventor: Zoltan Goncze, Oostburg, Wis.
[73] Assignee: Kohler Co., Kohler, Wis.
[21] Appl. No.: 227,421
[22] Filed: Apr. 14, 1994
[51] Int. Cl.⁶ ........................................... F16K 11/078
[52] U.S. Cl. ............................. 137/625.17; 137/625.4
[58] Field of Search ........................ 137/625.17, 625.4

[56] References Cited

U.S. PATENT DOCUMENTS

| | | | |
|---|---|---|---|
| 3,533,436 | 10/1970 | Parkison | 137/359 |
| 3,965,936 | 6/1976 | Lyon | 137/625.17 |
| 4,617,965 | 10/1986 | Lorch | 137/625.17 |
| 4,621,659 | 11/1986 | Pawelzik | 137/625.17 |
| 4,793,375 | 12/1988 | Marty | 137/270 |
| 4,856,556 | 8/1989 | Menningmann | 137/625.4 |
| 4,901,749 | 2/1990 | Hutto | 137/270 |
| 4,995,419 | 2/1991 | Pawelzik et al. | 137/625.17 X |
| 5,060,692 | 10/1991 | Pawelzik et al. | 137/625.4 |
| 5,080,134 | 1/1992 | Orlandi | 137/625.17 |
| 5,095,934 | 3/1992 | Iqbal | 137/270 |
| 5,329,958 | 7/1994 | Bosio | 137/625.17 X |

FOREIGN PATENT DOCUMENTS 3633483 4/2988 Germany ................... 137/625.17

OTHER PUBLICATIONS

A photograph of components of a Grohe valve, admitted prior art.

Primary Examiner—John Rivell
Attorney, Agent, or Firm—Quarles & Brady

[57] ABSTRACT

A cartridge type mixing valve is disclosed. A pin and groove arrangement is provided between an operating spindle and a plastic drive member to effect a linear movement of a valve disk. Wall members provide the groove arrangement, and additional interconnected wall members afford stability with a reduction of plastic material. Force load distribution on the drive member is effected by means of lateral extensions of the pin and groove. The pin is made integral so that a reduced size mixing valve can be achieved without loss of control over the drive member.

6 Claims, 2 Drawing Sheets

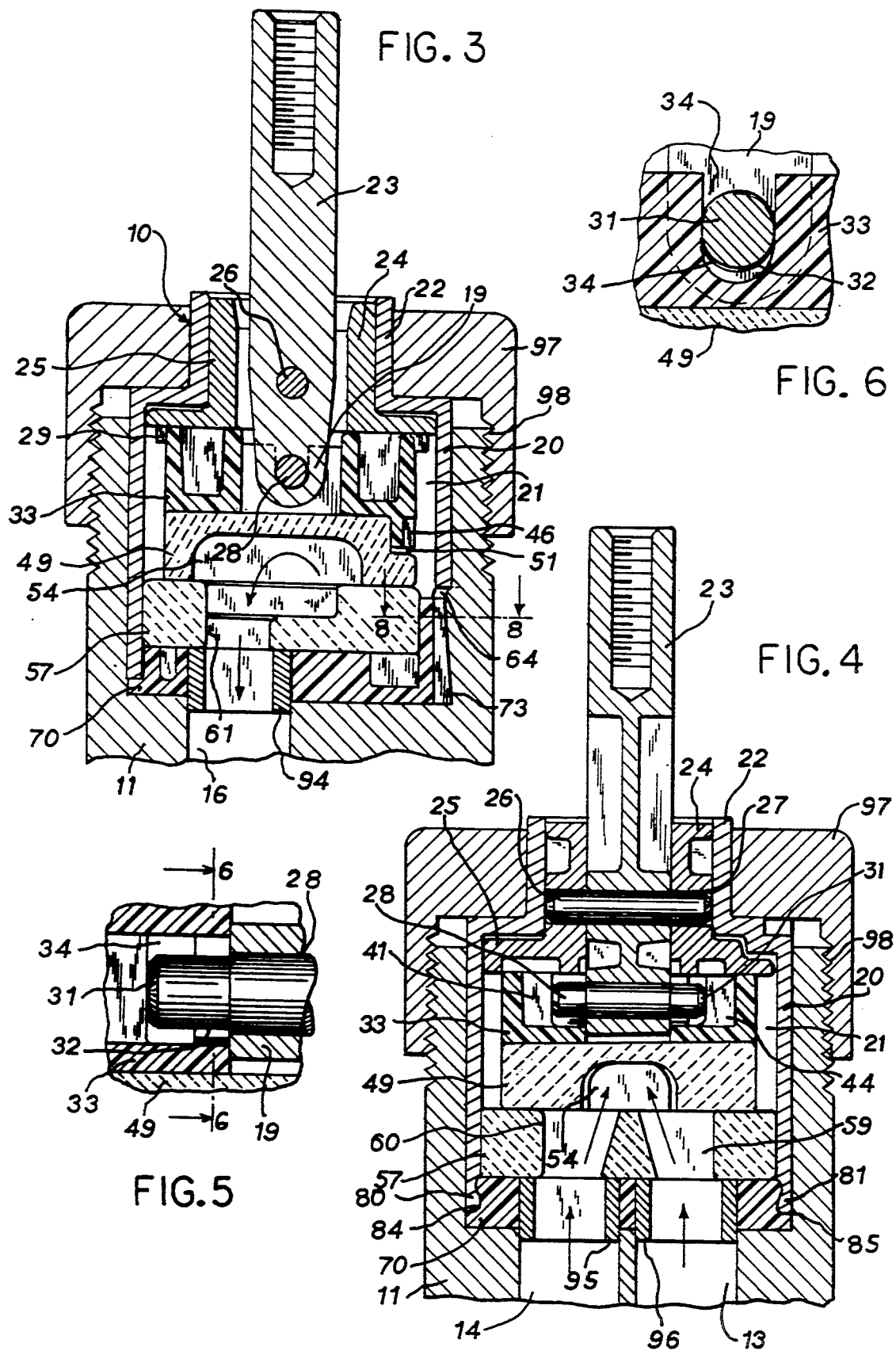

FLUID VALVE

BACKGROUND OF THE INVENTION

A. Field of the Invention

This invention relates primarily to faucets which control the mixing of hot and cold water. More particularly, the invention relates to faucets of the foregoing type wherein a movable disk is both rotated and directed in a linear manner over a stationary disk by an operating spindle.

B. Description of the Art

There are problems with certain mixing valves which utilize movable and stationary disks (e.g. ceramic disks). Ceramic material in movable disks is very hard and thus causes an abrasion problem when engaged over an extended period of time by a metallic or plastic driving spindle. Such a problem can be particularly of concern when a valve is employed like that described in U.S. Pat. No. 3,965,936 when a movable ceramic plate is directly engaged by a metallic or plastic spindle 37, and the spindle seeks to cause both rotation and translation of the disk.

Another problem with faucets of this type is the amount of force on the spindle needed to achieve proper rotation and translation of the valve disk. This is of greatest concern with small units.

Many of the prior art units are of the 35 or 42 mm. size. As the size of the spindle lower end is reduced so that it will fit through a smaller top bonnet, it becomes more and more difficult to achieve valve control using an integral lower end of the spindle.

Another factor is that to reduce costs, it is desirable to maximize use of plastic in the components above the disks yet to utilize a minimum amount of plastic and still maintain rigidity and stability. Still another cost factor is in having to machine metallic spindles to fit a ceramic disk or a drive member.

Thus, it can be seen that a need exists for an improved mixing valve.

SUMMARY OF THE INVENTION

In one aspect, the invention provides a fluid valve having a valve body with an axial bore suitable for fluid communication with an inlet and outlet. There is a stationary valve element having at least first and second fluid inlet pathways, and a movable valve element with both elements being positioned in the axial bore for regulating fluid flow of first and second fluids in response to movement of the movable element over the stationary element.

A rotatable and pivotable spindle extends within an upper end of the axial bore of the valve body, the spindle having one end extending outside the valve body and the other end extending into a recess in a drive member which operatively engages the movable valve element. A connection of the spindle to the drive member comprises an essentially horizontally extending pin extending from the spindle, and rotatable therewith, and an upwardly open transverse groove for receiving the pin so that rotation of the spindle on its longitudinal axis can rotate the drive member and the pivoting of the spindle laterally shifts the drive member. The open transverse groove is provided by two opposing wall portions which are interconnected by two additional wall portions.

In a preferred embodiment, the pin extends from opposing sides of the spindle, is not integrally formed with the spindle, but is limited in movement by opposing wall surfaces.

In another aspect, an adapter is connected to the spindle by a pivot member, and the adapter and drive member sandwich the pin.

In another embodiment, the drive member has legs for engaging slots in the top of the movable valve element.

In another aspect, the pin and the groove extend from opposing sides of the spindle, and the pin is essentially rounded.

The objects of the invention therefore include:

a. providing a valve of the above kind wherein the component parts can be manufactured from a variety of materials with the use of less expensive plastic being more prevalent, as well as lesser amounts of materials;

b. providing a valve of the above kind which can be manufactured in a reduced size yet can attain flow rate requirements with accurate valve control;

c. providing a valve of the above kind wherein force loads are widely distributed, resulting in long product life and reduced maintenance; and d. providing a valve of the above kind which is easily assembled and repaired.

These and still other objects and advantages of the invention will be apparent from the description which follows. In the detailed description below, a preferred embodiment of the invention will be described in reference to the accompanying drawings. The embodiment does not represent the full scope of the invention. Rather the invention may be employed in other embodiments. Reference should therefore be made to the claims herein for interpreting the breadth of the invention.

BRIEF DESCRIPTION OF THE DRAWINGS

FIG. 3 is a view in vertical section of the fluid valve shown in FIG. 1, where the valve has been mounted in a faucet housing;

FIG. 4 is a view similar to FIG. 3, with the view taken 90° therefrom;

FIG. 5 is an enlarged partial view showing a pin member of FIG. 4 engaging a groove of a drive member;

FIG. 6 is a sectional view taken along line 6—6 of FIG. 5;

DESCRIPTION OF THE PREFERRED EMBODIMENT

Figure 1:
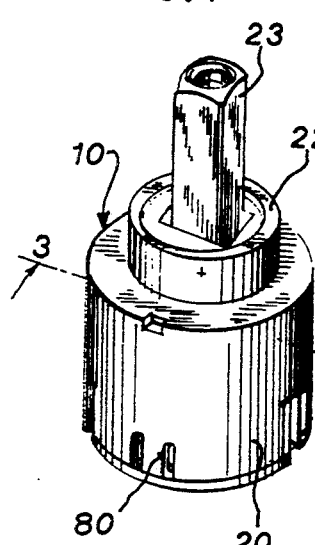
FIG. 1 is a perspective view showing a valve constituting a preferred embodiment of the invention.

Referring to FIGS. 1, 3 and 4, the cartridge valve assembly generally 10 is shown in conjunction with a faucet housing 11 in the usual manner. The housing 11 has the usual cold water inlet 13 and a hot water inlet 14. The direction arrows in FIG. 4 show the pathway of water into the cartridge valve from the usual hot and cold water pipes (not shown). FIG. 3 illustrates the water pathway out of the faucet housing through the outlet 16.

Figure 2:
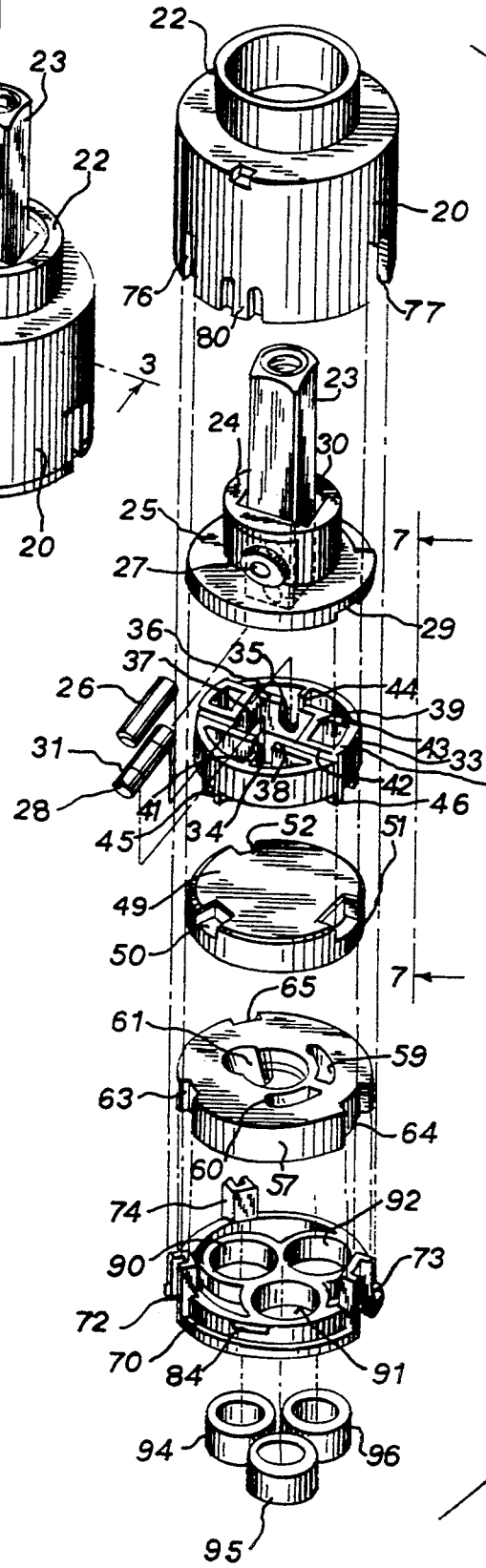
FIG. 2 is an exploded view of the valve of FIG. 1.

As best seen in FIGS. 2–4, plastic valve housing or body 20 has a sleeve 22 from which extends brass or plastic valve stem or spindle 23. The usual knob (not shown) can be placed on the internally threaded outer end of the stem. The valve body 20 has a bore 21 for receiving an adapter 25, a collar portion 24 of which also extends into the sleeve 22. The stem 23 is pivotally attached to the adapter 25 by the pin 26 extending through the collar portion 24 of the adapter 25 such as by means of the pin 26 extending through the opening 27.

A rectangular opening 30 is provided in the collar 24 to provide restrictive pivotal movement of the stem 23. Adapter 25 has a side to side groove portion 29 for receiving the raised portion 40 on the plastic drive member 33. Bearing grooves 34 and 35 are disposed in the walls 36 and 38 of drive member 33 to receive the reduced diameter end portions 31 of metallic pin 28 which is fixed in the end of stem 23 such as in the end portion 19. Walls 36 and 38 are supported by connecting walls 37 and 39. These walls 36–39 in the drive member 33 form a rectangular compartment for receiving the end portion 19 of the stem 23. Wall extensions 41 and 44 are spaced from grooves 34 and 35 to provide surfaces to limit lateral movement of pin 28.

Projections such as 45 and 46 extend from the drive member 33 for engagement in the grooves 50, 51 and 52 of a movable disk 49. The movable disk 49 and a stationary disk 57 are preferably of the ceramic type and are housed in the cavity 21 of the valve body 20. Movable disk 49 has a crescent shaped cold water inlet 59 and a hot water inlet 60, as well as a centrally disposed outlet passage 61. Fluid communication between the inlets 59 and 60 is effected by the passage 54 in the movable disk 49.

Figure 8:
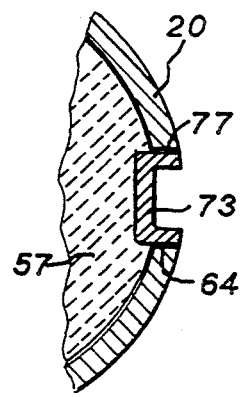
FIG. 8 is a sectional view taken along line 8—8 of FIG. 3.

Rotary movement of the stationary disk 57 is prevented, yet vertical movement allowed, by the arms 72, 73 and 74 of a seal cage member 70 which pass through the slots 63, 64 and 65 of the stationary disk 57. This is illustrated in part in FIG. 8. These arms orientate in slots such as 76 and 77 of the valve housing 20. Seal cage 70 has indents such as 84 and 85 for frictional engagement with flexible fingers such as 80 and 81 which hold the seal cage onto the valve housing 20 and accordingly retain the previously described component parts in the valve body. Cartridge valve assembly 10 is retained in faucet housing 11 by the bonnet 97 and the threads 98.

Seal cage 70 has three passages 90, 91 and 92 which orientate with the outlet passage 61 and the inlet passages 60 and 59 of stationary disk 57, respectively. Seal members 94, 95 and 96 are placed in the respective passages 90, 91 and 92 and serve to move the stationary disk 57 vertically and compress it against the movable disk 49.

Although not shown in the drawings, limited rotation of the stem 23 is effected by a recess in adapter 25 for contact with a projection from valve housing 20.

An important feature of the valve of this invention is the forming of the bearing grooves 34 and 35 in walls 36 and 38 with support from connecting walls 37 and 39. This allows for a plastic construction, as well as the use of a minimum amount. This is best illustrated in FIG. 2. Stability is further afforded by the wall extensions 41 and 44 which limit lateral movement of pin 28.

Figure 7:
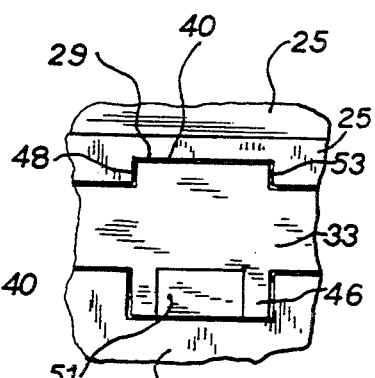
FIG. 7 is a plan view taken along line 7—7 of FIG. 2 and after components 25, 33 and 49 have been assembled.

The pin 28 and spindle 23 arrangement further allows for use of either a metal or plastic spindle with metallic pin 28, as well as a distribution of rotational forces. As best seen in FIG. 7, the raised portion 40 of drive member 33 provides guide surfaces 48 and 53 for drive member 33 in adapter 25. This affords accurate linear movement of the drive member 33 as well as to carry a part of the rotational forces. The remaining part of the rotational forces are transmitted by the rectangular opening formed by the walls 36–39 in the drive member 33 in conjunction with the end 19 of the valve stem 23.

Another feature is the limited pivoted movement of the stem 23 by the opening 30 in the adapter 25. This prevents the drive member 33 from contacting the inside of the valve housing 20.

Still another feature of the invention is the adapter 25 connected to the spindle 23 by the pivot member 26 and the adapter 25 and the drive member 33 sandwiching the pin 28. This affords a compact design.

Yet another feature is the drive member 33 having the legs such as 45 and 46 for engaging the slots 50–52 in the top of the movable valve element 49. This is best seen in FIGS. 2 and 7. The legs 45 and 46 have three directional movement to provide for a secure attachment of the movable disk 49 to the drive member 33, as well as tolerance compensation for the movable valve disk.

Yet another feature is the linear motion pin 28 extending from the spindle in two directions and being rounded so as to engage the rounded bearing surfaces 32. This affords a smooth linear or pivotal motion of the movable disk 49.

Thus, the invention provides an improved valve assembly. While a preferred embodiment has been described above, it should be readily apparent to those skilled in the art that a number of modifications and changes may be made without departing from the spirit and scope of the invention. For example, while a plumbing valve has been shown, the valve can be used in other types of fluid valves. Also, the specific materials mentioned are not the only materials which can be used. All such and other modifications within the scope of the invention are meant to be in the scope of the invention.

I claim:

1. A fluid valve, comprising:
    a valve body having an axial bore suitable for fluid communication with an inlet and outlet;
    a stationary valve element having at least first and second fluid inlet pathways, and a movable valve element, both elements being positioned in the axial bore for regulating fluid flow of first and second fluids in response to movement of the movable element over the stationary element; and
    a rotatable and pivotable spindle extending into an upper end of the axial bore of the valve body, the spindle having one end extending outside the valve body and the other end extending into a recess in a drive member that is separately formed from the movable valve element, the drive member operatively engaging the movable valve element;
    whereby connection of the spindle to the drive member comprises an essentially horizontally extending pin extending laterally outward from the spindle and, rotatable therewith, and an upwardly open transverse groove in the drive member for receiving the pin so that rotation of the spindle on its longitudinal axis can rotate the drive member and said pivoting of the spindle can laterally shift the drive member, said open transverse groove provided by two opposing wall portions which are interconnected by two additional wall portions; and wherein there is also an adapter connected to the spindle by a pivot member, the adapter and drive member sandwiching the pin with the pin being entirely housed within the drive member.

2. The valve of claim 1, wherein the pin extends from opposing sides of the spindle and is not integrally formed with the spindle.

3. The valve of claim 1, wherein the drive member has legs for engaging slots in the top of the movable valve element.

4. The valve of claim 1, wherein the pin and the groove in the drive member extend from opposing sides of the spindle.

5. The valve of claim 4, wherein the pin is essentially rounded in cross section.

6. The valve of claim 4, further including opposing wall surfaces spaced from the groove to limit lateral movement of the pin.

* * * * *